(12) United States Patent
Hasegawa (10) Patent No.: US 9,185,209 B2
(45) Date of Patent: Nov. 10, 2015

(54) CALL-DETAILS RECORDING DEVICE AND CALL-DETAILS RECORDING METHOD

(75) Inventor: Kaduhiko Hasegawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1401 days.

(21) Appl. No.: 12/585,896

(22) Filed: Sep. 28, 2009

(65) Prior Publication Data

US 2010/0020943 A1 Jan. 28, 2010

Related U.S. Application Data

(63) Continuation of application No. PCT/JP2007/057243, filed on Mar. 30, 2007.

(51) Int. Cl.
| | |
|---|---|
| *H04M 1/64* | (2006.01) |
| *H04M 3/42* | (2006.01) |
| H04M 1/725 | (2006.01) |
| H04M 3/51 | (2006.01) |
| H04M 7/00 | (2006.01) |

(52) U.S. Cl.
CPC ........ *H04M 3/42221* (2013.01); *H04M 3/5175* (2013.01); *H04M 7/006* (2013.01)

(58) Field of Classification Search
CPC ............ H04M 1/656; H04M 1/72502; H04M 1/72516
USPC ........................... 379/68, 69, 85, 67.1–88.28; 455/412.1–413
See application file for complete search history.

(56) References Cited

U.S. PATENT DOCUMENTS

| | | | | |
|---|---|---|---|---|
| 6,093,146 | A * | 7/2000 | Filangeri | 600/300 |
| 2001/0043697 | A1* | 11/2001 | Cox et al. | 379/265.06 |
| 2001/0055372 | A1* | 12/2001 | Glowny et al. | 379/88.22 |
| 2004/0179656 | A1* | 9/2004 | Takahashi | 379/67.1 |

(Continued)

FOREIGN PATENT DOCUMENTS

| | | |
|---|---|---|
| JP | 4-95452 | 3/1992 |
| JP | 11-205314 | 7/1999 |

(Continued)

OTHER PUBLICATIONS

International Preliminary Report on Patentability, mailed Oct. 20, 2009, in corresponding International Application No. PCT/JP2007/057243.
International Search Report for PCT/JP2007/057243, mailed May 15, 2007.
Japanese Patent Office Notice of Reasons for Rejection mailed Jun. 19, 2012, for corresponding Japanese Patent Application No. 2009-508851.

*Primary Examiner* — Solomon Bezuayehu
(74) *Attorney, Agent, or Firm* — Staas & Halsey LLP (57) ABSTRACT

A call-details recording device including: a detecting unit detecting a connection or disconnection of a call; a recording unit recording, when the detecting unit detects the call connection, details of the call by storing the voice data of the call-details in a storage device; and a reproduction enabling unit storing, when the detecting unit detects the call disconnection, the voice data recorded by the recording unit in a reproducible format in an accessible area of the storage device, wherein the detecting unit further detects execution of an interrupting operation of interrupting the conversation, and the reproduction enabling unit stores, when the detecting unit detects the interrupting operation, the voice data recorded by the recording unit to a point of time when executing the interrupting operation from a point of time when connecting the call in the reproducible format in the accessible area.

9 Claims, 7 Drawing Sheets

(56) References Cited

U.S. PATENT DOCUMENTS

| | | |
|---|---|---|
| 2005/0129216 A1 | 6/2005 | Tsujiuchi |
| 2005/0216549 A1 | 9/2005 | Amano et al. |
| 2006/0277270 A1* | 12/2006 | Lloyd et al. ............... 709/217 |
| 2007/0064888 A1* | 3/2007 | Nola et al. ............... 379/93.15 |
| 2008/0080482 A1* | 4/2008 | Calahan et al. ............ 370/352 |

FOREIGN PATENT DOCUMENTS

| | | |
|---|---|---|
| JP | 2002-191062 | 7/2002 |
| JP | 2005-244522 | 9/2005 |
| JP | 2006-135532 | 5/2006 |
| WO | 2004/023772 | 3/2004 |

* cited by examiner

| ORIGINATOR NUMBER | RECIPIENT NUMBER | CALL START TIME | MANAGEMENT NUMBER (RECORDING FILE NAME) |
|---|---|---|---|
| 03-1234-xxxx | 03-2345-xxxx | 2007/03/30 15:55:32 | 0001 |
| 03-7895-xxxx | 03-2345-xxxx | 2007/03/30 15:58:53 | 0002 |
| 03-5638-xxxx | 03-2345-xxxx | 2007/03/30 16:08:35 | 0003 |
| 03-8898-xxxx | 03-2345-xxxx | 2007/03/30 16:26:56 | 0004 |

| MANAGEMENT NUMBER | ORIGINATOR NUMBER | RECIPIENT NUMBER | CALL START TIME | |
|---|---|---|---|---|
| 0001 | 03-1234-xxxx | 03-2345-xxxx | 2007/03/30 15:55:32 | REPRODUCTION |
| 0002 | 03-7895-xxxx | 03-2345-xxxx | 2007/03/30 15:58:53 | REPRODUCTION |
| 0003 | 03-5638-xxxx | 03-2345-xxxx | 2007/03/30 16:08:35 | REPRODUCTION |
| 0004 | 03-8898-xxxx | 03-2345-xxxx | 2007/03/30 16:26:56 | REPRODUCTION |

CALL-DETAILS RECORDING DEVICE AND CALL-DETAILS RECORDING METHOD

CROSS-REFERENCE TO RELATED APPLICATION

This is a continuation of Application PCT/JP2007/057243, filed on Mar. 30, 2007, now pending, the contents of which are herein wholly incorporated by reference.

FIELD

The embodiments discussed herein are relates to a call-details recording device.

BACKGROUND

There have hitherto been a network conference system (refer to Patent document 1) which accumulates conference data about a network conference and regenerates the conference data at a variable speed and also an electronic conference system (refer to Patent document 2) enabling users participating afterward to catch up with a discussion proceeding in real time by providing past messages to these participants in a way that narrows down or compresses time intervals of the past messages and thus reproduces the messages.

Moreover, an AV (Audio Visual) system (refer to Patent document 3) exists, which enables a viewer to retrieve an interrupted position and continuously view the program when moving away from a TV in the middle of viewing the program and returning thereto.

Furthermore, there is an operator support system (refer to Patent document 4) which records a call (conversation) of an operator and attaches a tag associated with details of the call to a record of the call.

[Patent document 1] Japanese Patent Laid-Open Publication No. 2005-244522
[Patent document 2] Japanese Patent Laid-Open Publication No. H11-205314
[Patent document 3] Japanese Patent Laid-Open Publication No. 2006-135532
[Patent document 4] International Publication Pamphlet WO 2004/023772

SUMMARY

Specifically, the present invention is a call-details recording device including: a storage device stored with voice data; a detecting unit detecting a connection or disconnection of a call of a recording target telephone terminal; a recording unit recording, when the detecting unit detects the call connection, details of the call (conversation) by storing the voice data of the call-details of the telephone terminal in the storage device; and a reproduction enabling unit storing, when the detecting unit detects the call disconnection, the voice data recorded by the recording unit in a reproducible format in an area, accessible from other terminals, on the storage device, wherein the detecting unit further detects execution of an interrupting operation of interrupting the conversation while keeping a call-connected status, and the reproduction enabling unit stores, when the detecting unit detects the interrupting operation, the voice data recorded by the recording unit to a point of time when executing the interrupting operation from a point of time when connecting the call in the reproducible format in the area, accessible from other terminals, on the storage device.

The object and advantage of the embodiment will be realized and attained by means of the elements and combinations particularly pointed out in the claims. It is to be understood that both the foregoing general description and the following detailed description are exemplary and explanatory only and are not restrictive of the invention, as claimed.

DESCRIPTION OF EMBODIMENTS

First Embodiment

The present invention enables the third party to grasp the details of the call proceeding so far with respect to the not-disconnected call.

An embodiment of a call-details recording device (a voice logger) according to the present invention will hereinafter be described with reference to the drawings.

Figure 1:
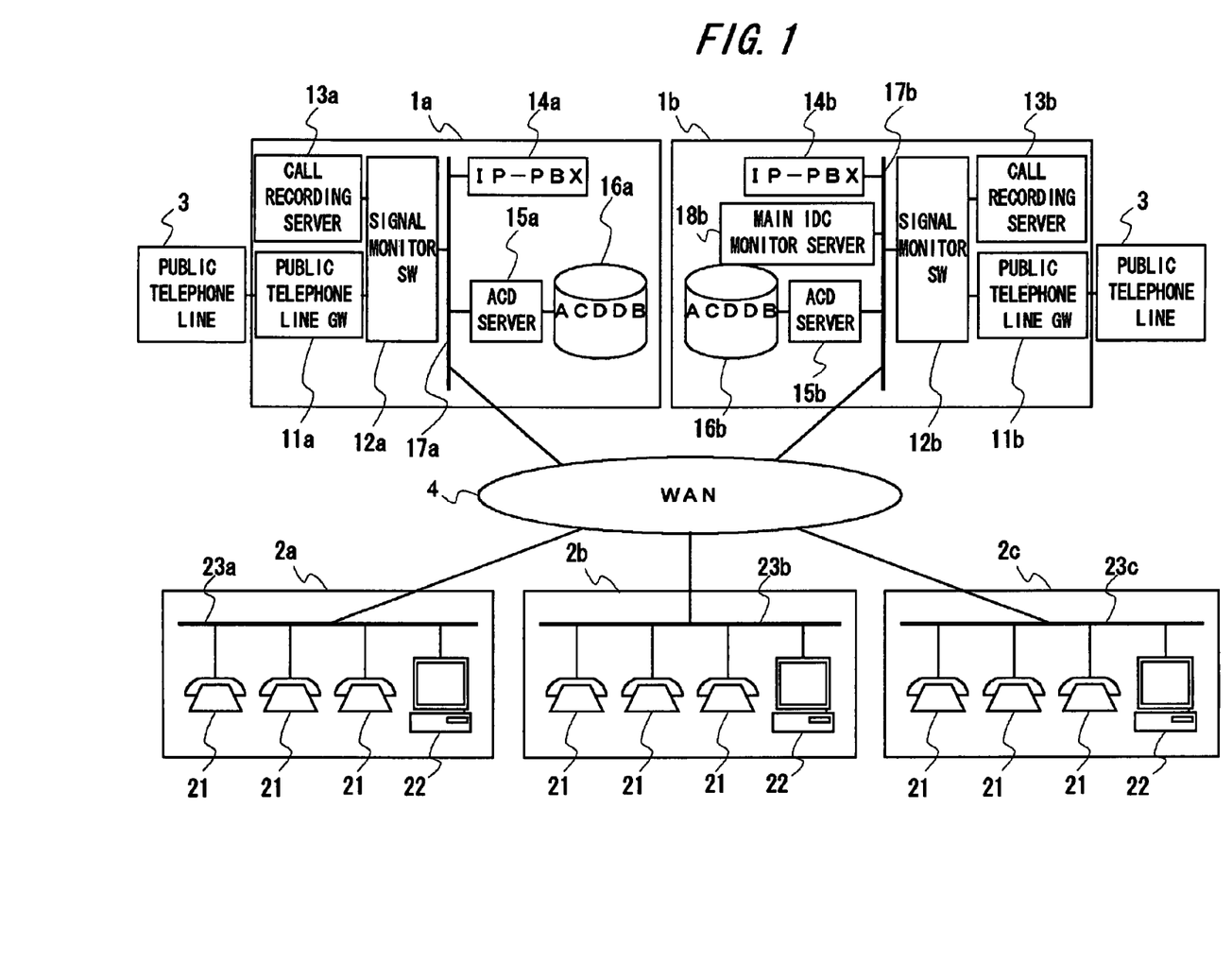
FIG. 1 is a diagram illustrating an outline of a whole call center system in an embodiment.

FIG. 1 is a diagram illustrating an outline of a whole call center in the embodiment. A call center system in the embodiment is configured by IDCs (Internet Data Centers) 1a, 1b which receive inbound calls from a public telephone line (public telephone network) 3, distributes the inbound calls to IP phone terminals 21 operated by an operator and accumulates (archives) information utilized in the system, and by call center base points (call center agent stations) 2a, 2b, 2c connected to the IDCs 1a, 1b via a WAN (Wide Area Network) 4. In the embodiment, a plurality of call center agent stations 2a, 2b, 2c exists (FIG. 1 illustrates only three agent stations, however, the number of the agent stations is not limited). Further, two IDCs 1a, 1b reside, in which the IDC 1a is a main IDC which normally operates, and the IDC 1b is a backup IDC which does not operate in a normal status but operates, when the main IDC 1a is disabled from providing a call center service, to thereby provide the service continuously. A preferable scheme is that the main IDC 1a and the backup IDC 1b are installed in places located geometrically away from each other so as to avoid a situation that both of these IDCs may not operate simultaneously due to a regional factor such as a disaster.

The main IDC 1a is equipped with a public telephone network GW (Gateway) 11a, a signal monitor switch 12a, a call recording server 13a, an IP-PBX (Private Branch Exchange) 14a, and ACD (Automatic Call Distributor) server 15a and an ACD DB (Database) 16a, which are connected to each other via a LAN (Local Area Network). FIG. 1 depicts a network taking a bus topology as a LAN 17a, however, a network is sufficient, which enables the respective devices to communicate with each other, and the LAN 17a is not limited to the bus network.

The public telephone network GW 11a is a device which absorbs a difference in communication system between the public telephone network 3 and the LAN 17a, and serves as an intermediary of (relays) the inbound call from the public telephone network 3. In the embodiment, the public telephone network 3 involves using an analog telephone network, however, an IP phone network may also be employed in place of the analog telephone network. For example, if a call control protocol used in the IP phone network is SIP (Session Initiation Protocol) and a telephone communication protocol used within the call center system is similarly the SIP, the public telephone network GW 11a is defined as a SIP-SIP Gateway.

The signal monitor switch 12a relays a packet transferred and received between the public telephone network GW 11a and the LAN 17a, and copies and transmits the packet flowing through the signal monitor switch 12a to the call recording server 13a. The signal monitor switch 12a is, e.g., an L2 (Layer2) switch, and the call recording server 13a is connected to a mirror port of the L2 switch.

The call recording server 13a restores voice information from the packet containing the voice information in the received packets, and records the voice information. The restored voice information is recorded in, e.g., an MP3 (Moving Picture Experts Group Audio Layer-3) format in a storage device included by the call recording server 13a.

The IP-PBX 14a is a private branch exchange for the IP phone. The IP-PBX 14a distributes the inbound calls relayed by the public telephone network GW 11a to the IP phone terminals 21 of the call center agent stations 2a, 2b, 2c. On this occasion, the IP-PBX 14a, when determining which IP phone terminal 21 the inbound call is distributed to, queries the ACD server 15a and distributes the inbound call to the IP phone terminal 21 of the operator designated by the ACD server 15a.

The ACD server 15a has a function of designating a destination to which the inbound call arriving at the IP-PBX 14a is distributed. On this occasion, the ACD server 15a generates a call ID defined as a unique identifier for identifying the call and notifies each IP phone terminal 21 of this identifier. Simultaneously, the ACD server 15a, which is also a statistic information management device, acquires various items of operation-related information on the communications of the IP phone terminals 21, and accumulates the operation-related information together with the call IDs as operation-related records in the ACD DB 16a. The thus-accumulated communication information is output as a report. Further, on the occasion of determining the distributing destination of the inbound call, this determination may also be made based on the accumulated communication information.

The backup IDC 1b has the same configuration as the main IDC 1a has. Moreover, the backup IDC 1b is provided with a main IDC monitor server 18b in addition to the configuration of the main IDC 1a. As described above, the main IDC 1a is the IDC 1 which operates in the normal status, while the backup IDC 1b is normally in a so-called cold standby status but does not provide, as the IDC 1, the service to each of the call center agent stations 2a, 2b, 2c till the main IDC monitor server 18b issues a system start request.

Further, the ACD DB 16a of the main IDC 1a and the ACD DB 16b of the backup IDC 1b are always mirrored to each other. Therefore, the ACD DB 16a and the ACD DB 16b retain the same contents (data) at all times.

The call center agent stations 2a, 2b, 2c are equipped with the IP phone terminals 21 and client terminals 22 and are connected to each other via LANs 23a, 23b, 23c. As in the case of the IDC 1, the LANs 23a, 23b, 23c are not likewise limited to the bus network.

The IP phone terminal 21 is a device which receives the inbound call distributed by the IP-PBX 14a and is used for conversing with a customer. The operator logs in to the IP-PBX 14a with a self-allocated operator ID by employing the self-used IP phone terminal 21. The IP-PBX 14a is therefore capable of grasping which operator uses the IP phone terminal 21 and which IP phone terminal 21 the relevant operator employs. Further, the operator performs the conversation by using a telephone receiver of the IP phone terminal 21 and can utilize a hold function, an escalation function, etc by pressing a hold button, an escalation button, etc provided on the IP phone terminal 21. The IP phone terminal 21 transmits an event notification packet to the IP-PBX 14a on such a per-event basis that the operator presses the button, etc. The IP-PBX 14a receives this event notification packet and provides a hold service, an escalation service, etc. For example, the IP-PBX 14a, when receiving a hold event notification packet, transmits a packet containing voice (sound) information of a hold tone to the public telephone network GW 11a, thereby letting the customer listen to the hold tone.

The client terminal 22 is a terminal for browsing the communication information accumulated in the ACD DB 16a by the ACD server 15a, and includes input devices such as a keyboard and a mouse and output devices such as a display and a printer (illustrations thereof are omitted). The client terminal 22 transmits, through an operator's operation, a report output request to the ACD server 15a and outputs the report transmitted by the ACD server 15a in response to this request. An output mode shall include a variety of output options such as displaying a report on the display, outputting a printed report and outputting a file-formatted report. Further, the client terminal 22 has a Web Browser for accessing a Web server 136 of the recording management server 132 which will be described later on and displaying an interface for selecting a record file.

Note that each of the public telephone network GW 11a, the signal monitor switch 12a, the call recording server 13a, the IP-PBX 14a, the ACD server 15a, the ACD DB 16a, the main IDC monitor server 18b, the IP phone terminal 21 and the client terminal 22 is a computer including a CPU (Central Processing Unit), a main storage device such as a RAM (Random Access Memory), an auxiliary storage device such as an HDD (hard Disk Drive) and an EEPROM (Electrically Erasable and Programmable Read Only Memory) and a network interface such as a NIC (Network Interface Card). The signal monitor switch 12a may not, however, include the storage device.

Figure 2:
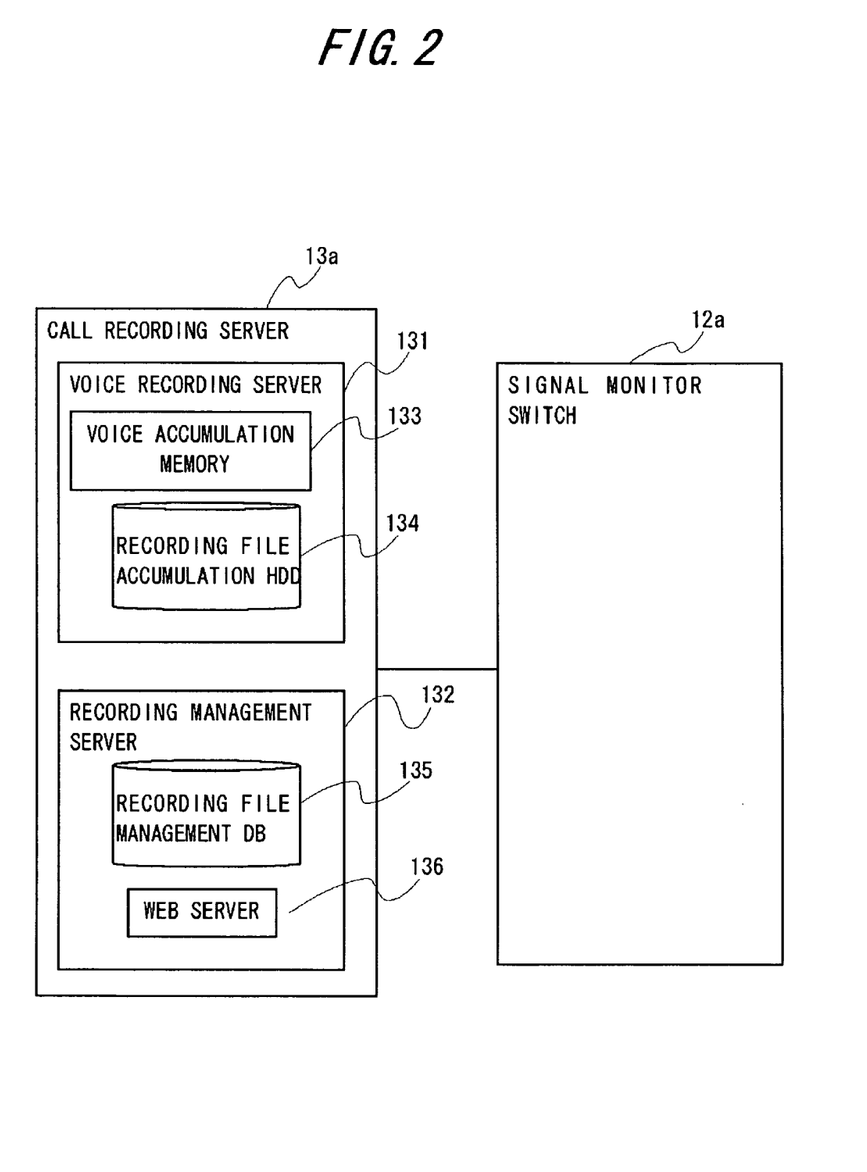
FIG. 2 is a diagram illustrating a detailed configuration of a call recording server in the embodiment.

FIG. 2 is a diagram illustrating a detailed configuration of the call recording server 13a in the embodiment. The call recording server 13a in the embodiment includes a voice recording server 131 and the recording management server 132. The voice recording server 131 receives the packet mirrored by the signal monitor switch 12a, restores the voice information from this packet, and stores the voice information as voice data in a voice accumulation memory 133, thus recording the information. Further, the voice recording server 131 acquires an originator number and a recipient number from the packet related to the inbound call event mirrored by the signal monitor switch 12a, and stores these numbers together with call start time and a management number as items of information for identifying the recorded voice data. Moreover, the voice recording server 131 has the auxiliary storage device such as a recording file accumulation HDD 134, and saves the voice data with the recoding completed as a recording file used for reproducing the voice on the recording file accumulation HDD 134.

Figure 3:
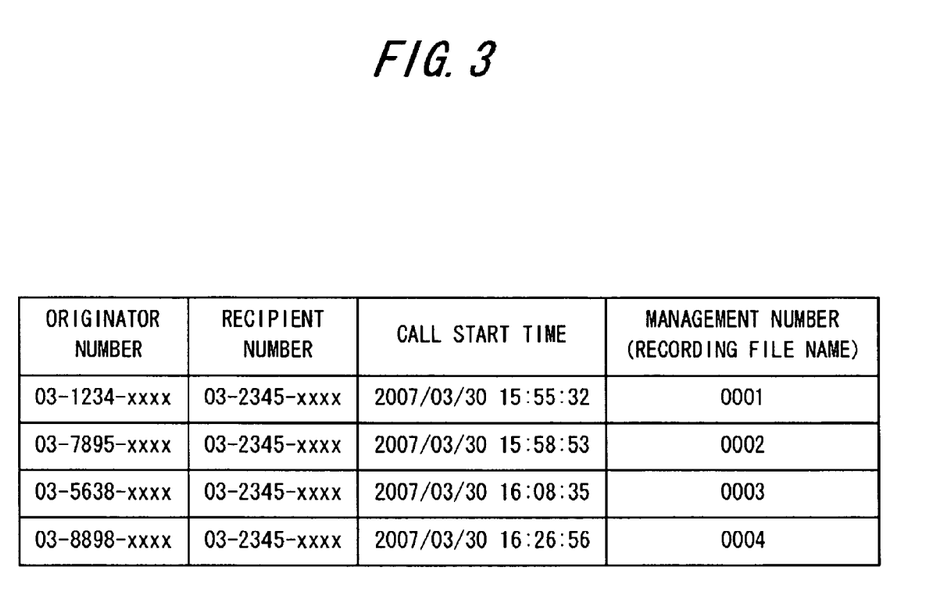
FIG. 3 is a diagram illustrating a structure of recording file management information in the embodiment.

The recording management server 132 has a recording file management database 135 for managing the recording files stored by the voice recording server 131, and the Web server 136 which provides the client terminal 22 with an interface for retrieving the recording file. The recording file management database 135 is a database built up on the HDD included by the recording management server 132, and is stored with the recording file management information in which the originator number, the recipient number and the call start time each acquired by the voice recording server 131 are associated with the items of information (which are the management number and a file name in the embodiment) indicating a location of the recording file saved on the recording file accumulation HDD 134 of the voice recording server 131 (see FIG. 3). The recording management server 132 manages the recording file, thereby facilitating, when desiring to reproduce the recorded voice, detection of a target recording file.

Figure 4:
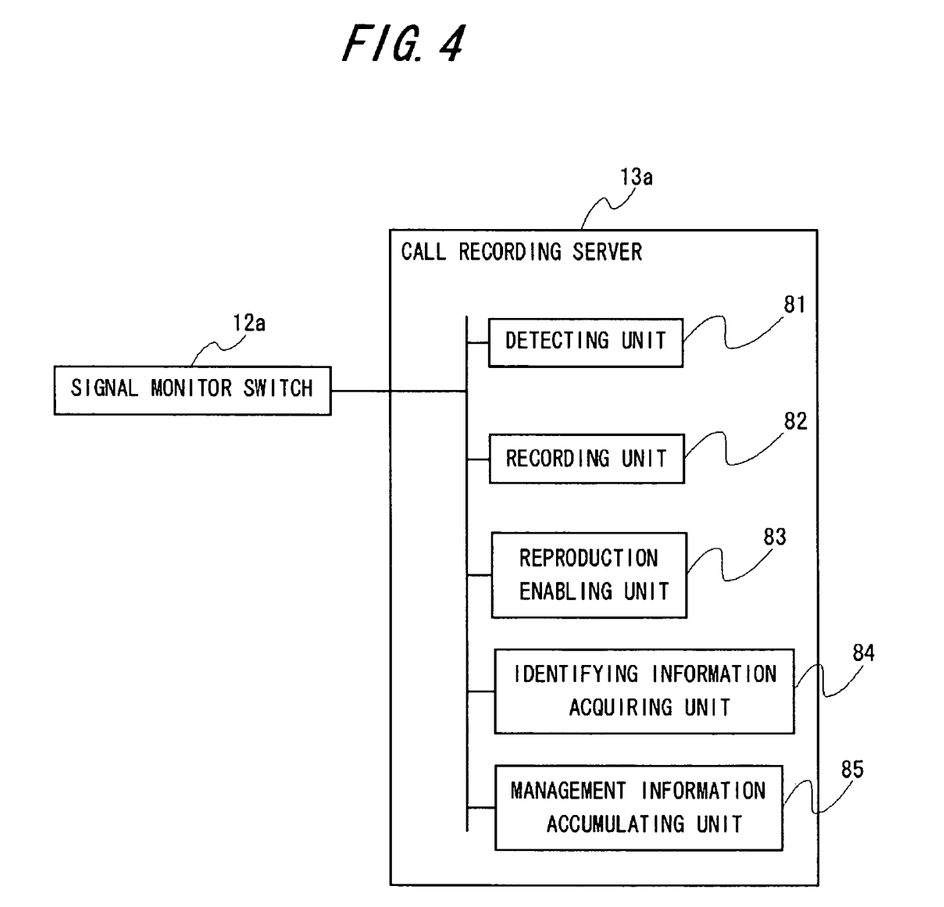
FIG. 4 is a diagram illustrating a functional configuration of the call recording server in the embodiment.

FIG. 4 is a diagram illustrating a functional configuration of a call recording server 13a. The call recording server 13a includes a detecting unit 81 which detects a connection or disconnection of the call related to the IP phone terminal 21, a recording unit 82 which records details of the call by storing, when the detecting unit 81 detects the connection of the call, the voice accumulation memory 133 with the voice data of the call-details in the IP phone terminal 21, a reproduction enabling unit 83 which stores, when the detecting unit 81 detects the disconnection of the call, the voice data recoded by the recording unit 82 as a recording file on the recording file accumulation HDD 134, an identifying information acquiring unit 84 which acquires the management information, and a management information accumulating unit 85 (the recording file management database 135) stored with the recording file management information. Note that these respective function units are realized in such a way that the CPU executes programs etc developed on the memory included by the call recording server 13a to thereby control the NIC and the storage devices described above, and may also be realized as dedicated processors.

Figure 5:
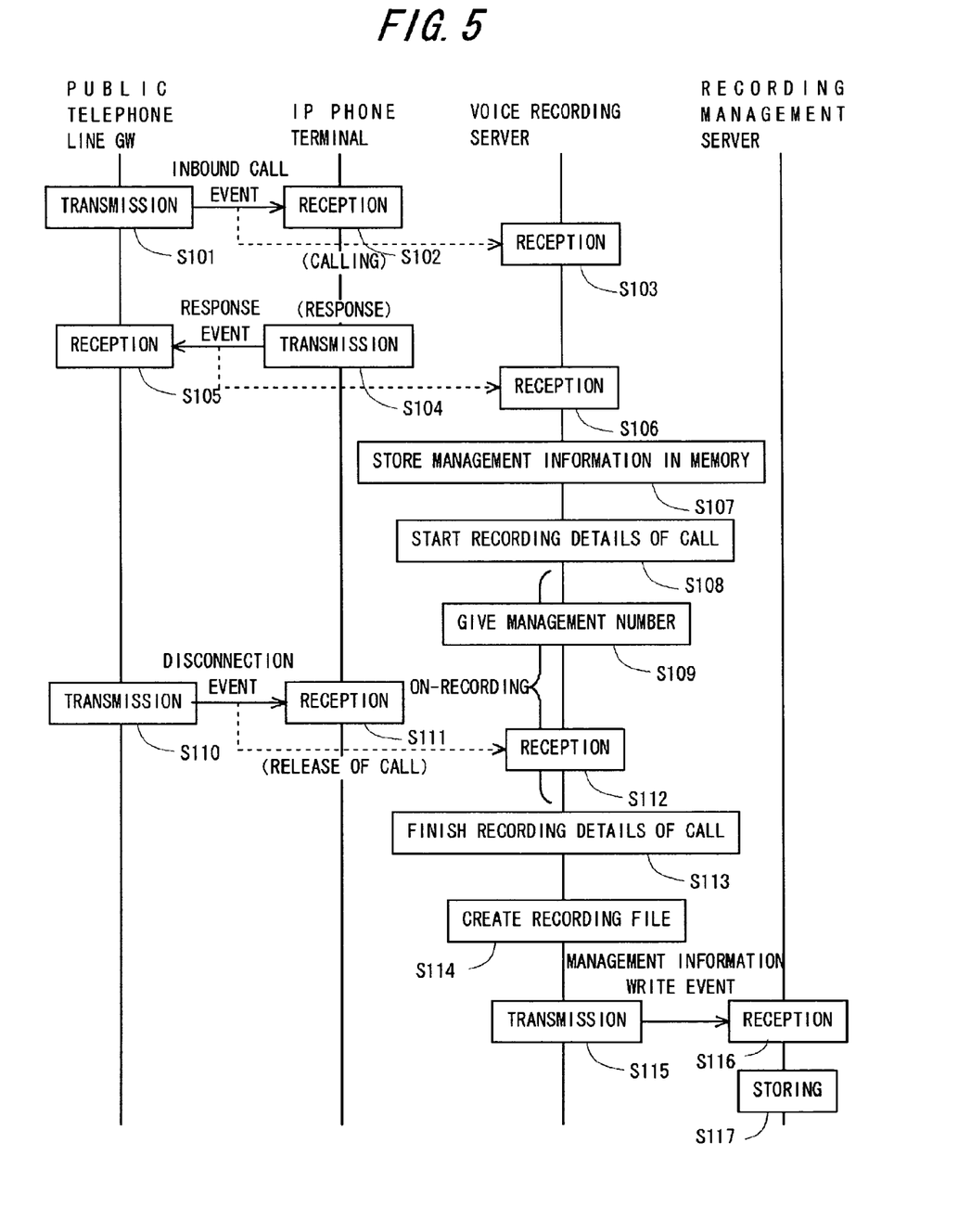
FIG. 5 is a sequence diagram illustrating a flow of a call recording process in the embodiment.

Herein, a flow of a normal call recording process in the call center according to the embodiment will be described. FIG. 5 is a sequence diagram illustrating the flow of the call recording process in the embodiment. The process illustrated in this sequence diagram is started upon a call arrival at the public telephone network GW via the public telephone network 3 and is controlled by the CPUs included in the IP phone terminal 21, the public telephone network GW 11a and the call recording server 13a.

In steps S101 and S102, notification of an inbound call event is given. The public telephone network GW 11a, when detecting the inbound call via the public telephone network 3, notifies the IP phone terminal 21 of this inbound call through the IP-PBX 14a (step S101). The IP phone terminal 21 notified of the inbound call event gets in a calling status (step S102). The "calling status" represents a status of reproducing a calling tone and waiting for detecting that the operator takes the telephone receiver. Note that the packet related to this inbound call event contains an originator number and a recipient number of the inbound call. Thereafter, the process advances to step S103.

In step S103, a mirrored inbound call notification packet is acquired by the call recording server 13a. The inbound call event related packet transmitted by the public telephone network GW 11a is transferred by the signal monitor switch 12a to the IP-PBX 14a. On this occasion, the signal monitor switch 12a creates a copy of the inbound call event related packet and transmits the copied packet to the call recording server 13a. The call recording server 13a receives the copied packet transmitted by the signal monitor switch 12a and acquires the originator number and the recipient number contained in the received packet. Thereafter, the process advances to step S104.

In steps S104 and S105, the notification of a response event is given. The IP phone terminal 21 getting into the calling status in step S102, when detecting that the operator picks up the receiver, notifies the public telephone network GW 11a of the response event via the IP-PBX 14a (step S104). Then, the public telephone network GW 11a notified of the response event takes the intermediary of the response event for the public telephone network 3, thereby starting the conversation between the IP phone terminal 21 and the public telephone network 3 (step S105). Thereafter, the process advances to step S106.

In step S106, the mirrored response event notification packet is acquired by the call recording server 13a. The response event related packet transmitted by the IP phone terminal 21 is transferred to the public telephone network GW 11a by the signal monitor switch 12a. On this occasion, the signal monitor switch 12a creates a copy of the response event related packet and transmits the copied packet to the call recording server 13a. The call recording server 13a received the copied packet transmitted by the signal monitor switch 12a, then specifies call start time based on time information or transmitting/receiving time contained in the received packet, and stores this call start time. Thereafter, the process advances to step S107.

In step S107, the management information is created. The call recording server 13a creates the management information containing the originator number, the recipient number and the call start time each stored in steps S103 and S106, and stores the management information in the storage device. Thereafter, the process advances to step S108.

In steps S108 and S109, the recording of the call-details is started, and the management number is given (allocated). In the embodiment, the public telephone network 3 and the IP phone terminal 21 transmits and receives the packet containing the voice information, thus performing the conversation. Herein, the signal monitor switch 12a generates copied packets of both of the packet transmitted to the IP phone terminal 21 from the public telephone network GW 11a and the packet transmitted to the public telephone network GW 11a from the IP phone terminal 21, and transmits these copied packets to the call recording server 13a. The call recording server 13a receiving the copied packets restores the voice information in the packets and stores the restored information as the voice data in the voice accumulation memory 133, thus conducting the recording (step S109). Further, with a start of recording the call-details, the call recording server 13a gives (allocates) the management number for identifying this call and the recording thereof. Thereafter, the process proceeds to step S110.

In steps S110 and S111, the notification of a disconnection event is given. The public telephone network GW 11a, when detecting a disconnection request given from the public telephone network 3, notifies the IP phone terminal 21 of the disconnection event via the IP-PBX 14a (step S110). The IP phone terminal 21 receiving the notification of the disconnection event finishes transmitting and receiving the voice packet, and releases the call (step S111). Thereafter, the process advances to step S112.

In step S112, the call recording server 13a acquires the mirrored disconnection event notification packet. The disconnection event related packet transmitted by the public telephone network GW 11*a* is transferred by the signal monitor switch 12*a* to the IP-PBX 14*a*. On this occasion, the signal monitor switch 12*a* creates a copy of the disconnection event related packet, and transmits the copied packet to the call recording server 13*a*. The call recording server 13*a* receives the copied packet transmitted by the signal monitor switch 12*a*, and detects an end of the call (conversation). Thereafter, the process proceeds to step S113.

In steps S113 and S114, the recording of the call-details is ended, and further a recording file is created. The call recording server 13*a* receiving the disconnection event notification packet which undergoes mirroring in step S112 finishes recording the call-details (step S113), outputs the voice data stored in the voice accumulation memory 133 as a file in a reproducible format, and stores this file in the recording file accumulation HDD 134 of the call recording server 13*a* (step S114). On this occasion, the voice data (i.e., the voice data related to the voice of the customer) recorded from the packet transmitted to the IP phone terminal 21 via the public telephone network GW 11*a* is synthesized with the voice data (i.e., the voice data related to the voice of the operator) recorded from the packet transmitted to the public telephone network GW 11*a* via the IP phone terminal 21 so that the call-details (conversation) between the two sides are reproduced by reproducing the single file. Herein, the "synthesization" is not limited to mixing the plurality of voice signals into the single voice signal but may involve organizing the single recording file by allocating voice data of both sides to right and left channels of a stereo unit. Moreover, the call recording server 13*a* diverts the management number acquired in step S109 to a file name of the created recording file. Thereafter, the process advances to step S115.

In steps S115 through S117, the recording file management information is accumulated in the recording file management database 135. When the recording file is recorded in the recording file accumulation HDD 134 of the call recording server 13*a*, the voice recording server 131 notifies the recording management server 132 of a recording file management information write event (step S115). A packet related to the recording file management information write event contains a file name of the recording file together with the management information created in step S107. The recording management server 132 receiving the recording file management information write event notification packet (step S116) acquires the originator number, the recipient number, the call start time and the management number (the file name of the recording file) concerning the recorded call from the received packet, and adds the recording file management information containing these items of information to the recording file management database 135 (step S117). The recording file management information is thus registered in the recording file management database 135, thereby enabling the user to easily find out and reproduce the target recording file. Thereafter, the process illustrated in the sequence diagram is terminated.

Figure 6:
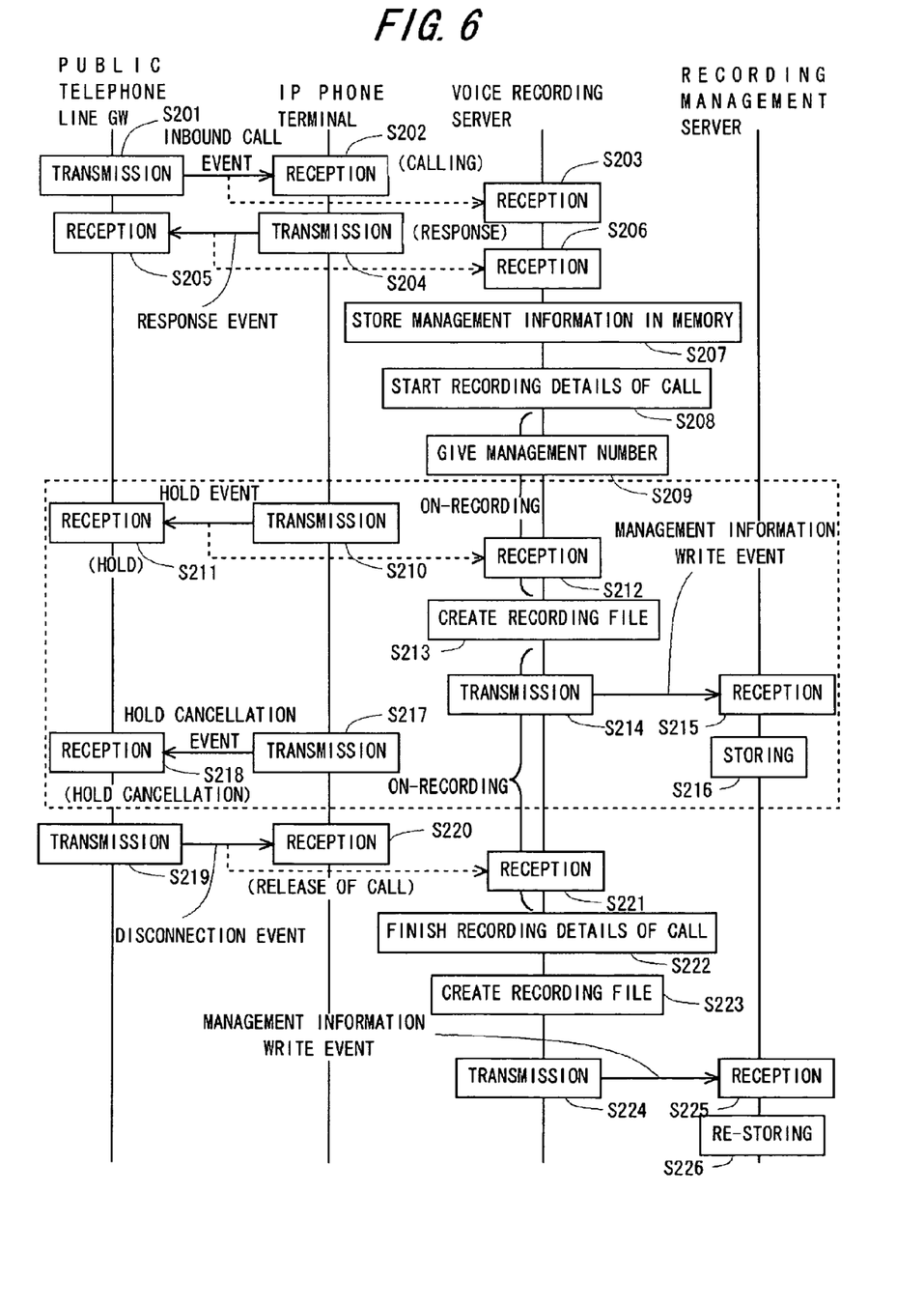
FIG. 6 is a sequence diagram illustrating a flow of the call recording process in the case of conducting an operation such as a hold during the call in the embodiment.

Next, a flow of the call recording process according to the present invention in the call center system in the embodiment will be explained. FIG. 6 is a sequence diagram illustrating the flow of the call recording process in the case of performing an operation such as the hold during the call in the embodiment. The process illustrated in this sequence diagram is started upon the arrival of the inbound call at the public telephone network GW from the public telephone network 3 and is controlled by the CPUs included in the IP phone terminal 21, the public telephone network GW 11*a* and the call recording server 13*a*.

The process illustrated in steps S201 through S209 is the process till the recording of the call-details is started after the inbound call has arrived at the public telephone network GW and is the same as the process depicted in steps S101 through S109 in FIG. 5, so that the description thereof is omitted.

In steps S210 and S211, the notification of a hold event is given. The IP phone terminal 21, when detecting that the operator temporarily interrupts the call while keeping the call connection such as pressing the escalation button and the hold button, transmits the hold event to the public telephone network GW 11*a* (step S210) The public telephone network GW 11*a* receiving the hold event notification transmits, to the public telephone network 3, hold tone information used for the telephone terminal of the customer to reproduce a hold tone on the basis of the packet containing the voice (sound) information of the hold tone, which is transmitted by the IP-PBX 14*a* (step S211). Thereafter, the process advances to step S212.

In step S212, the call recording server 13*a* acquires the mirrored hold event notification packet. The hold event related packet transmitted by the IP phone terminal 21 is transferred by the signal monitor switch 12*a* to the public telephone network GW 11*a*. On this occasion, the signal monitor switch 12*a* creates a copy of the hold event related packet and transmits the copied packet to the call recording server 13*a*. The call recording server 13*a* receives the copied packet transmitted by the signal monitor switch 12*a* and detects that the call is interrupted. Thereafter, the process advances to step S213.

In step S213, the recording file is created. The call recording server 13*a* receiving the hold event notification packet which undergoes mirroring in step S112 outputs the voice data as the reproducible-formatted-file, which is stored in the voice accumulation memory 133, and stores the file in the recording file accumulation HDD 134. In this case, however, the recording process started in step S208 is not terminated. This point is different from the process in steps S113 and S114 of finishing the recording and creating the recording file on the occasion of releasing the call. Note that the process of synthesizing the bidirectionally-transmitted voice information on the occasion of creating the recording file is as explained in step S114. Furthermore, the call recording server 13*a* diverts the management number acquired in step S209 to the file name of the recording file to be created. Thereafter, the process advances to step S214.

In steps S214 through S216, the recording file management information is accumulated in the recording file management database 135. The in-depth description of the process is the same as of the process in steps S115 through S117 illustrated in FIG. 5 and is therefore omitted. Thereafter, the process proceeds to step S217.

In steps S217 and S218, the notification of a hold cancellation event is given. The IP phone terminal 21, when detecting that the operator performs an operation of resuming the conversation with respect to the conversation-interrupted call, transmits the hold cancellation event to the public telephone network GW 11*a* (step S217). The public telephone network GW 11*a* receiving the hold cancellation event notification stops transmitting the hold tone information, and resumes the transmitting/receiving relay of the voice information packet between the IP phone terminal 21 and the public telephone network 3 (step S218). Thereafter, the process advances to step S219.

The process illustrated in steps S219 through S226 is substantially the same as the process illustrated in steps S110 through S117, and hence the description thereof is omitted. The process illustrated in step S226 is different from the process illustrated in step S117 in terms of overwriting the information stored in step S216. In step 226, contents of the recording file management information are updated with the information of the recording file created finally with respect to the conversation-completed call, whereby the contents of the recording file management database 135 can be kept latest.

Figure 7:
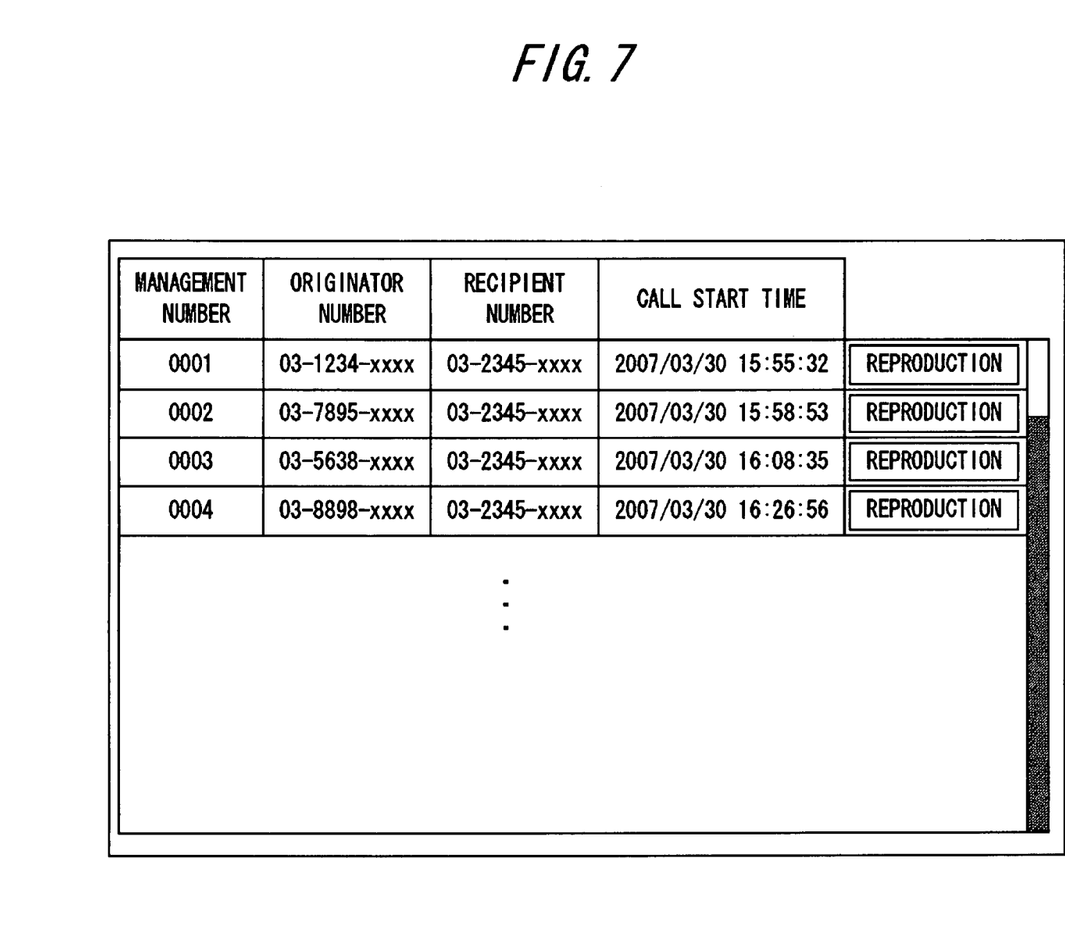
FIG. 7 is a diagram depicting an image of a recording file selection screen displayed on a display of a client terminal in the embodiment.

FIG. 7 is a diagram illustrating an image of a recording file selection screen displayed on the display of the client terminal 22 in the embodiment. The user accesses the Web server 136 of the recording management server 132 by operating the client terminal 22, thereby enabling an interface for selecting the recording file to be displayed on the display of the client terminal 22 by use of the Web Browser of the client terminal 22. The user specifies the target recording file in a way that uses, as keys, the originator number, the recipient number and the call start time or the management number that are displayed on the display, and selects and clicks a reproduction button with a mouse, thus conducting the reproduction. On this occasion, the voice is reproduced by a voice data reproducing function provided in the client terminal 22.

In the call center system, the call-details recording device enabling the call-details to be recorded and the recorded call-details to be reproduced after an end of the call (conversation) has hitherto been employed, however, the conventional call-details recording device does not create the recording file unless the call is disconnected with the completion of the call (conversation). Accordingly, in the conventional call-details recording device, the third party could neither trace back nor listen to the details of the call in the status of keeping the call connected. According to the embodiment, the event such as pressing the hold button etc is detected, the recording file of the voice data recorded halfway as triggered by this event to thereby keep the call connected, in which case also the third party is enabled to trace back and listen to the details of the call.

Second Embodiment

There is a call center equipped with a private branch exchange and a plurality of telephones managed by this PBX and receiving an inbound call from a customer. In this type of call center, when the operator responds to the inbound call from the customer by use of the telephone, a necessity may arise for temporarily holding the call and performing escalation up to a leader etc. For example, if a trouble occurs in the middle of dealing with the call of the customer and if the operator encounters a difficulty of singly coping with the trouble, the call is held on, and the escalation is performed.

Further, on the occasion of conducting the escalation, normally operator himself or herself needs to explain the leader etc a course of events about how the necessity for performing the escalation arises. This is because the great majority of call centers can, though the details of the call have been recorded, reproduce the recorded details of the call after completion of the call (after disconnecting the call).

In such a case, the leader receives the explanation of the course of event of how the problem has occurred from only a viewpoint of the operator and can grasp the details of the conversation with the customer only through a report from the operator. Therefore, in the conventional call center, it is time-consuming for the leader etc to grasp where the problem exists, resulting in an increased length of time needed to solve the problem in the case of performing the escalation in the middle of dealing with the customer.

It is an object of the present embodiment to, in view of the problems described above, enable the third party to grasp the details of the call (conversation) proceeding so far with respect to the call which is not yet disconnected.

The present embodiment enables the third party to grasp the details of the call proceeding so far with respect to the not-disconnected call by detecting an interrupting operation in a telephone terminal and making reproducible voice data which has already been recorded up to a point of time when the interrupting operation is detected.

Specifically, the present embodiment is a call-details recording device including: a storage device stored with voice data; a detecting unit detecting a connection or disconnection of a call of a recording target telephone terminal; a recording unit recording, when the detecting unit detects the call connection, details of the call (conversation) by storing the voice data of the call-details of the telephone terminal in the storage device; and a reproduction enabling unit storing, when the detecting unit detects the call disconnection, the voice data recorded by the recording unit in a reproducible format in an area, accessible from other terminals, on the storage device, wherein the detecting unit further detects execution of an interrupting operation of interrupting the conversation while keeping a call-connected status, and the reproduction enabling unit stores, when the detecting unit detects the interrupting operation, the voice data recorded by the recording unit to a point of time when executing the interrupting operation from a point of time when connecting the call in the reproducible format in the area, accessible from other terminals, on the storage device.

In the call-details recording device according to the present embodiment, the start of recording the call-details is triggered by the detecting unit's detecting the call connection. On this occasion, the recording unit stores the call-details as the voice data in the storage device.

After establishing the call connection, when the call (conversation) is finished as it is and the call is disconnected, the recorded voice data is recorded in the area, accessible from other terminals, on the storage device. Normally, other terminals are hard to access the in-recording voice data for reasons such as restricting an access to the area stored with the in-recording voice data from a device other than the call-details recording device, and so on. Therefore, the voice data may not be reproduced from other terminals till a reproduction enabling process is carried out.

Herein, according to the present embodiment, even when the interrupting operation is conducted, already-recorded segments of the voice data recorded halfway are recorded in the area accessible from other terminals. With this scheme, the call-details recording device according to the present embodiment can reproduce the details of the call in a way that traces back the call in continuation without waiting for the call to be disconnected.

Further, in the present embodiment, the detecting unit may detect the connection, the disconnection or the interrupting operation of the call of a telephone terminal connected to a network, and the recording unit may record the call-details by acquiring the voice data transmitted and received by the telephone terminal from on the network and storing the voice data in the storage device.

Especially in a telephone system utilizing an IP network that has frequently used in the recent years, the connection, the disconnection or the interrupting operation of the call can be grasped by acquiring a variety of event notification packets flowing across the network. Furthermore, as for the recording, the packet containing the voice information is acquired, and the voice data is restored from the acquired packet and stored in the storage device, whereby the recording can be done.

Still further, in the present embodiment, the detecting unit may detect the connection, the disconnection or the interrupting operation of the call of the telephone terminal by acquiring information transmitted and received between the telephone terminal and a device managing the telephone terminal.

Herein, the device managing the telephone terminal is exemplified by a gateway etc which relays the communications with an exchange and a public telephone network. The telephone terminal is normally managed by some sort of management device and transmits and receives control information to and from this management device. Hence, the connection, the disconnection or the interrupting operation of the call can be detected by obtaining the information transmitted and received between the telephone terminal and the management device.

Yet further, in the present embodiment, the call-details recording device may further, the reproduction enabling unit getting the voice data stored as a recording file in the storage device, include: an identifying information acquiring unit acquiring information for identifying the call of which the call-details are recorded; and a management information accumulating unit stored with the identifying information acquired by the identifying information acquiring unit in the way of being associated with the recording file by way of recording file management information.

With a scheme of accumulating the information for identifying the call and the recording file in the way of being associated with each other, the target recording file can be easily specified even when a large quantity of recording files are accumulated.

Moreover, the present embodiment can be grasped by way of a method executed by a computer or a program making the computer execute the method. For example, the present embodiment is a call-details recording method by which a call-details recording device including a storage device stored with voice data executes: detecting a connection or disconnection of a call of a recording target telephone terminal; recording, when the call connection is detected in the detecting, details of the call (conversation) by storing the voice data of the call-details of the telephone terminal in the storage device; and reproduction enabling by storing, when the call disconnection is detected in the detecting, the voice data recorded in the recording in a reproducible format in an area, accessible from other terminals, on the storage device, wherein the detecting involves further detecting execution of an interrupting operation of interrupting the conversation while keeping a call-connected status, and the reproduction enabling involves storing, when detecting the interrupting operation in the detecting, the voice data recorded in the recording to a point of time when executing the interrupting operation from a point of time when connecting the call in the reproducible format in the area, accessible from other terminals, on the storage device.

Furthermore, the present embodiment may also be a recording medium recorded with the program making the computer execute the method, which can be read by the computer, other devices, machines, etc. Herein, the recording medium readable by the computer, etc. connotes a recording medium capable of accumulating information such as data, programs, etc. electrically, magnetically, optically, mechanically or by chemical action, which can be read from the computer etc.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such example in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A call-details recording device comprising:
   a storage device to store voice data;
   a detecting unit that detects a connection or disconnection of a call of a recording target telephone terminal connected to a packet communication network;
   a recording unit that records, when the detecting unit detects the call connection, details of the call by acquiring the voice data transmitted and received by the telephone terminal from the network and storing the voice data of the call-details of the telephone terminal in the storage device; and
   a reproduction enabling unit that stores, when the detecting unit detects the call disconnection, data including the voice data converted into a reproducible format in the storage device,
   wherein the detecting unit further detects execution of an interrupting operation while keeping a call-connected status,
   the reproduction enabling unit stores, when the detecting unit detects the interrupting operation, data including the voice data recorded by the recording unit to a point of time when executing the interrupting operation from a point of time when connecting the call after converting into reproducible format in the storage device, and
   the reproduction enabling unit updates the data, which is stored in the reproducible format in the storage device, that includes the voice data recorded to the point of time when executing the interrupting operation from the point of time when connecting the call, with the voice data recorded by the recording unit to a point of time when disconnecting the call from the point of time when connecting the call, when the detecting unit detects the call disconnection and the data including the voice data recorded to the point of time when executing the interrupting operation from the point of time when connecting the call is stored in the reproducible format in the storage device by the reproduction enabling unit.

2. The call-details recording device according to claim 1, wherein the detecting unit detects the connection, the disconnection or the interrupting operation of the call of the telephone terminal by acquiring information transmitted and received between the telephone terminal and a device managing the telephone terminal.

3. The call-details recording device according to claim 1, wherein the reproduction enabling unit stores the data including the voice data as a recording file in the storage device, and
   wherein the call-details recording device further comprises:
   an identifying information acquiring unit that acquires information for identifying the call of which the call-details are recorded; and
   a management information accumulating unit that stores the identifying information acquired by the identifying information acquiring unit in the way of being associated with the recording file by way of recording file management information.

4. A call-details recording method by which a call-details recording device including a storage device to store voice data executes:

detecting a connection or disconnection of a call of a recording target telephone terminal connected to a packet communication network;

recording, when the call connection is detected in the detecting, details of the call by acquiring the voice data transmitted and received by the telephone terminal from on the network and storing the voice data of the call-details of the telephone terminal in the storage device; and reproduction enabling by storing, when the call disconnection is detected in the detecting, data including the voice data recorded in the recording converted into a reproducible format in the storage device, wherein the detecting involves further detecting execution of an interrupting operation while keeping a call-connected status, the reproduction enabling involves storing, when detecting the interrupting operation in the detecting, data including the voice data recorded in the recording to a point of time when executing the interrupting operation from a point of time when connecting the call after converting into reproducible format in the storage device, and the reproduction enabling updates the data, which is stored in the reproducible format in the storage device, that includes the voice data recorded to the point of time when executing the interrupting operation from the point of time when connecting the call, with the voice data recorded by the recording to a point of time when disconnecting the call from the point of time when connecting the call, when the detecting detects the call disconnection and the data including the voice data recorded to the point of time when executing the interrupting operation from the point of time when connecting the call is stored in the reproducible format in the storage device by the reproduction enabling.

5. The call-details recording method according to claim 4, wherein the detecting involves detecting the connection, the disconnection or the interrupting operation of the call of the telephone terminal by acquiring information transmitted and received between the telephone terminal and a device managing the telephone terminal.

6. The call-details recording method according to claim 4, wherein the call-details recording device further, the data including the voice data being stored as a recording file in the storage device in the reproduction enabling, executes:

acquiring information for identifying the call of which the call-details are recorded; and management information accumulating by storing the identifying information acquired in the acquiring in the way of being associated with the recording file by way of recording file management information.

7. A call-details recording system comprising:
a telephone terminal that is connected to a packet communication network and serves as a recording target;
a storage device to store voice data;
a detecting unit that detects a connection or disconnection of a call of the telephone terminal;
a recording unit that records, when the detecting unit detects the call connection, details of the call by acquiring the voice data transmitted and received by the telephone terminal from on the network and storing the voice data of the call-details of the telephone terminal in the storage device; and
a reproduction enabling unit that stores, when the detecting unit detects the call disconnection, data including the voice data recorded by the recording unit converted into a reproducible format in the storage device,
wherein the detecting unit further detects execution of an interrupting operation while keeping a call-connected status,
the reproduction enabling unit stores, when the detecting unit detects the interrupting operation, data including the voice data recorded by the recording unit to a point of time when executing the interrupting operation from a point of time when connecting the call after converting into reproducible format in the storage device, and
the reproduction enabling unit updates the data, which is stored in the reproducible format in the storage device, that includes the voice data recorded to the point of time when executing the interrupting operation from the point of time when connecting the call, with the voice data recorded by the recording unit to a point of time when disconnecting the call from the point of time when connecting the call, when the detecting unit detects the call disconnection and the data including the voice data recorded to the point of time when executing the interrupting operation from the point of time when connecting the call is stored in the reproducible format in the storage device by the reproduction enabling unit.

8. The call-details recording system according to claim 7, wherein the detecting unit detects the connection, the disconnection or the interrupting operation of the call of the telephone terminal by acquiring information transmitted and received between the telephone terminal and a device managing the telephone terminal.

9. The call-details recording system according to claim 7, wherein the reproduction enabling unit stores the data including the voice data stored as a recording file in the storage device, and wherein the call-details recording system further comprises:

an identifying information acquiring unit that acquires information for identifying the call of which the call-details are recorded; and a management information accumulating unit that stores the identifying information acquired by the identifying information acquiring unit in the way of being associated with the recording file by way of recording file management information.

\* \* \* \* \*